US006948124B2

(12) United States Patent
Combs et al.

(10) Patent No.: US 6,948,124 B2
(45) Date of Patent: Sep. 20, 2005

(54) GRAPHICAL USER INTERFACE UTILIZING THREE-DIMENSIONAL SCATTER PLOTS FOR VISUAL NAVIGATION OF PICTURES IN A PICTURE DATABASE

(75) Inventors: Tammara Combs, Sammamish, WA (US); Prasad V. Prabhu, Macedon, NY (US); Douglas B. Beaudet, Geneseo, NY (US); Laura A. Muniz, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 536 days.

(21) Appl. No.: 09/742,955

(22) Filed: Dec. 20, 2000

(65) Prior Publication Data

US 2002/0075324 A1 Jun. 20, 2002

(51) Int. Cl.[7] .................................................. G06F 3/14
(52) U.S. Cl. ....................................... 715/712; 715/855
(58) Field of Search ................................ 715/853–855, 715/712–713, 719–726, 805, 848–852, 837, 963, 967, 968; 345/837, 730–732, 782, 848–852, 835–839, 765–774, 744–747, 804, 805, 853–855; 707/5, 102

(56) References Cited

U.S. PATENT DOCUMENTS 5,708,826 A * 1/1998 Ikeda et al. .............. 715/501.1
5,983,220 A * 11/1999 Schmitt ......................... 707/5
6,006,191 A * 12/1999 DiRienzo ....................... 705/2
6,121,969 A * 9/2000 Jain et al. .................... 345/853
6,195,122 B1 * 2/2001 Vincent ....................... 348/169
6,222,937 B1 * 4/2001 Cohen et al. ............... 382/154
6,275,229 B1 * 8/2001 Weiner et al. .............. 715/764
6,492,989 B1 * 12/2002 Wilkinson .................. 345/440
6,834,280 B2 * 12/2004 Auspitz et al. ................ 707/3

* cited by examiner

*Primary Examiner*—Steven Sax
(74) *Attorney, Agent, or Firm*—David M. Woods

(57) ABSTRACT

A novel graphical user interface (GUI) using metadata, generates three-dimensional scatter plots (100, 200, 300, 400) for the efficient and aesthetic navigation and retrieval of pictures in a picture database. The first and second dimensions (102, 104, 202, 204, 302, 304, 402, 404) represent abscissas and ordinates corresponding to two picture characteristics chosen by the user. Distinguishing characteristics of icons (108–126, 208–230, 308–326, 408–430) in the scatter plot (100, 200, 300, 400), which icons represent groups of pictures, indicate the third dimension, also chosen by the user. In the preferred embodiment, the third dimension is indicated by the color of the icon (108–126, 208–230, 308–326, 408–430). Along with many other possibilities, the three dimensions of a scatter plot (100, 200, 300, 400) can represent combinations of "Who," "What," "When," "Where," and "Why" picture characteristic information contained in the picture metadata. Activating an icon (108–126, 208–230, 308–326, 408–430) produces a thumbnail of the pictures in the group represented by the particular icon (108–126, 208–230, 308–326, 408–430). Updating one display dimension dynamically updates the other display dimensions.

30 Claims, 3 Drawing Sheets

GRAPHICAL USER INTERFACE UTILIZING THREE-DIMENSIONAL SCATTER PLOTS FOR VISUAL NAVIGATION OF PICTURES IN A PICTURE DATABASE

FIELD OF THE INVENTION

The present invention relates to graphical user interfaces in general, and in particular to graphical user interfaces adapted for browsing and retrieving pictures in picture databases.

BACKGROUND OF THE INVENTION

Digital pictures and digital picture albums/collections are proliferating with recent advances in quality and cost reductions. Digital pictures can be stored in common or individual databases that allow a user to retrieve his or her pictures for viewing and reproduction via a computer system. The pictures can be stored as discrete files, or as linked files such as in a strip of film, for example. When a large number of pictures are stored in a collection, it is desirable to be able to browse and retrieve selected pictures with a graphical user interface (GUI). Used for such an application, a GUI conveniently organizes and groups database pictures, and allows a user to browse the pictures in one or more displays.

Along with the digital information representing pictures, digital image files can also contain metadata, or information not displayed, which nonetheless characterizes the data comprising the pictures. The metadata can describe the scene in the picture, such as a caption, and can also provide in a straightforward manner, information such as the date and time the picture was captured, the location from which the picture was captured, identify people or objects in the picture, and information regarding format and data structure.

Many prior art digital cameras can be programmed to automatically store along with the actual image, the date and time a picture was captured. More advanced digital cameras can also be programmed to automatically store along with the actual image, the location of picture capture by harnessing automatic location systems. For example, the Global Positioning Satellite (GPS) is a well-known method for pinpointing the location of a special GPS receiver with a fairly high degree of accuracy. Other methods include the use of Radio Triangulation (RT) systems. Using such an approach, a GPS receiver can be either incorporated in the hardware of the digital camera, or located nearby. A subsequent image file will contain not only the raw image data, but also a date and time stamp, along with header information related to the location of the GPS receiver when the image is collected.

Still more advanced digital cameras may contain pattern recognition software for identifying objects and people in an image, and converting such information to metadata.

Whether metadata is entered automatically by the camera, manually via the camera during picture captures, or subsequently into the digital image database, there remains a great need for improved GUIs for efficiently and attractively arranging pictures in a digital image database.

Many prior art methods for navigating picture databases still involve the use of Boolean word searches, which can be both awkward and unpleasant to view. Even when prior art GUIs are used for picture database navigation, it is desirable to browse an entire filmstrip without disregarding pictures that do not match search criteria. It is also desirable to search via icons representing pictures without having to type in search terms, and to have the ability to dynamically change a GUI display and search criteria with "drag and drop" operations.

SUMMARY OF THE INVENTION

To overcome the substantial deficiencies associated with prior art picture database navigation and retrieval operations, the method of the present invention at least includes the steps of providing a first display dimension representing a first characteristic of grouped pictures, providing a second display dimension representing a second characteristic of grouped pictures, providing a third display dimension representing a third characteristic of grouped pictures, and providing in the manner of a scatter plot, a plurality of picture icons plotted according to a first dimension along a first axis corresponding to the first display dimension, and a second dimension along a second axis corresponding to the second display dimension, each picture icon representing a group of pictures in a picture database. The third dimension is evidenced by distinct visual characteristics of the icons.

The present invention also provides a graphical user interface adapted to navigate and retrieve pictures in a picture database. The graphical user interface at least includes a first display dimension generator adapted to generate a first display dimension representing a first characteristic of grouped pictures, a second display dimension generator adapted to generate a second display dimension representing a second characteristic of grouped pictures, a third display dimension generator adapted to generate a third display dimension representing a third characteristic of grouped pictures, and an icon generator adapted to generate in the manner of a scatter plot, a plurality of picture icons plotted according to a first dimension along a first axis corresponding to the first display dimension, and a second dimension along a second axis corresponding the second display dimension, each picture icon representing a group of pictures in a picture database. The third dimension is evidenced by distinct visual characteristics of the icons.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

The graphical user interface (GUI) of the present invention novelly uses a dynamically linked, three-dimensional scatter plot for navigating and retrieving pictures in picture database, based upon picture metadata of pictures and picture filmstrips. The first two dimensions are displayed by locating icons (each representing a group of pictures) in two dimensions according to an ordered pair. The abscissa and ordinate pertain to two separate picture characteristics.

The third dimension of the three-dimensional scatter plot is a third picture characteristic. The value of the third dimension is indicated by the visual appearance of the plotted icons. In the preferred embodiment, the visual appearance and hence the third dimension is indicated by distinct colors which can be assigned to specific gradations of the third picture characteristic. However, other approaches to indicating the third dimension are possible, given the essence of the present invention, including unique shapes of the icon.

Figure 1:
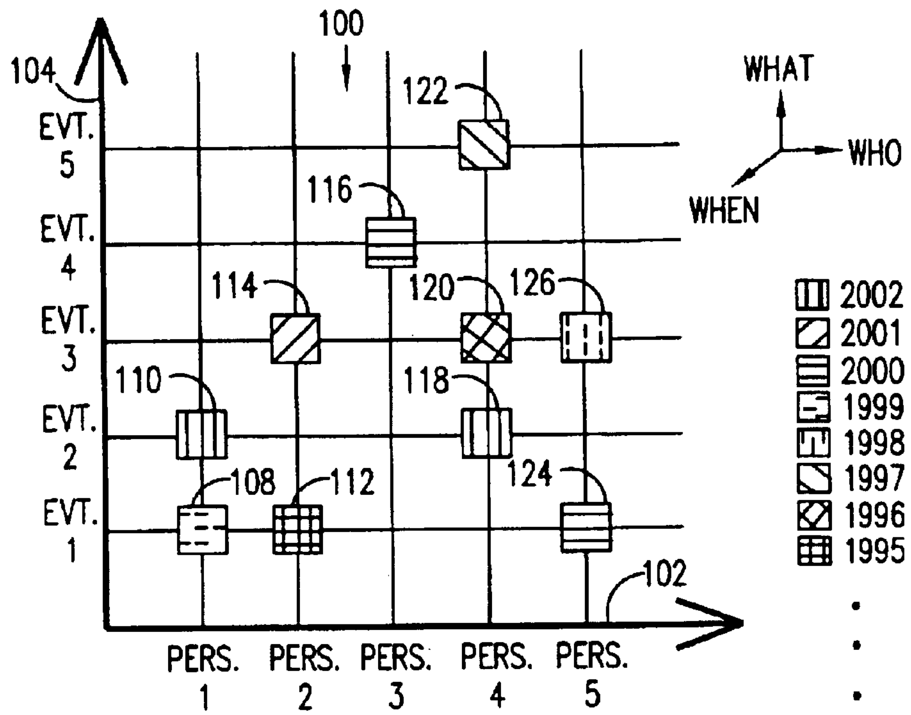
FIG. 1 is an example of a display generated by the graphical user interface (GUI) of the present invention, wherein the axes of three-dimensional scatter plot contained therein, represent "who," "what," and "when" picture categorization information.

Referring to FIG. 1, the three-dimensional scatter plot 100 shows one embodiment of the present-inventive GUI. The axes (102 and 104) of the three-dimensional scatter plots of the present-inventive GUI represent picture characteristics such as "Who," "What," "When," "Where," and "Why." "Who" refers to people in the pictures identified by the metadata. "What" refers to distinct events identified by the metadata. "When" is a temporal characterization of the pictures and can include the date and/or the time of capture, as identified by the metadata. "Where" refers to the capture location of the pictures. "Why" refers to specific comments or explanations about the pictures in the metadata. Almost any standard comments can be accommodated by the GUI of the present invention. For example, the comments supported can include the identity of the photographer where one can be identified.

The Who-What-When display 100 in FIG. 1 has the ability to group pictures in the database according to the people featured, according to events portrayed by the pictures, and by the year-date the pictures were captured. The icons 108–126 represent picture groupings in the scatter plot. Since the drawing figures are black and white, the colors are represented by the patterns on the icons, according to standard drafting conventions. The red (or pink) icons represent pictures captured in the year 2002; brown in the year 2001; blue in the year 2000; gray (or silver) in the year 1999; violet (or purple) in the year 1998; green in the year 1997; orange in the year 1996; and yellow (or gold) in the year 1995. Additional years, and of course distinct colors can be used with the present invention.

The icon 108 can represent a group of pictures in the database that contain a first identifiable person (e.g., Husband/Father of a family, or Wife/Mother), as part of a first identifiable event (e.g., New Year's Day), captured in the year 1999. As another example, the icon 116 might represent a group of pictures in the database containing the first-born daughter during a fourth identifiable event (e.g., Valentine's Day), captured during the year 2000.

The user can browse thumbnail representations of the pictures in a group by activating the icon (e.g., clicking a pointer while it is placed over the top of the icon).

Figure 2:
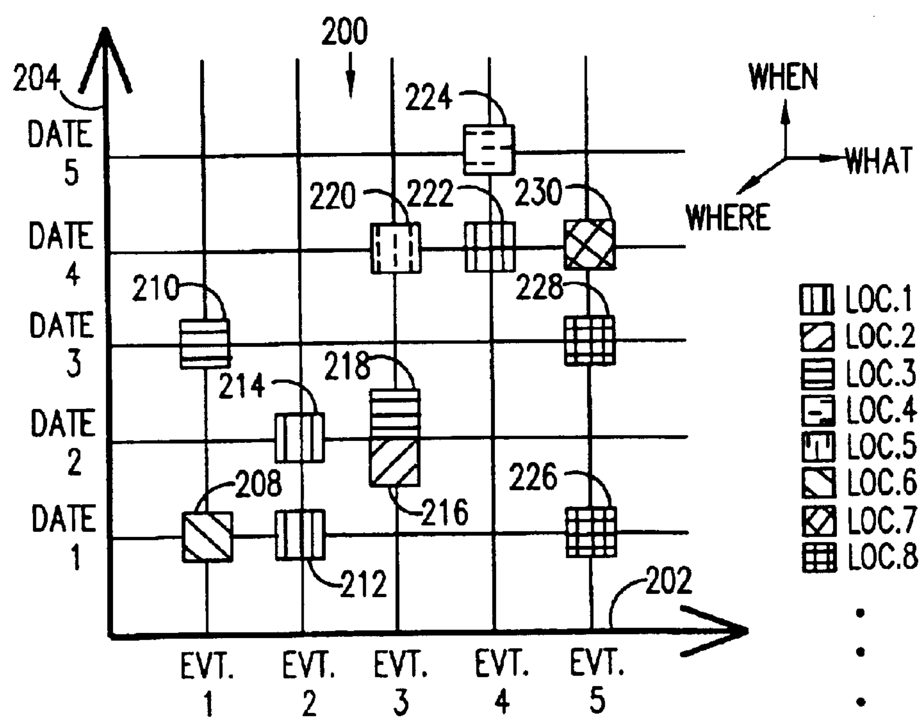
FIG. 2 is an example of a display generated by the GUI of the present invention, wherein the axes of three-dimensional scatter plot contained therein, represent "what," "when," and "where" picture categorization information.

The three-dimensional scatter plot 200 in FIG. 2 is an example of a What-When-Where display using identifiable events and dates as the abscissa and ordinate (along the axes 202 and 204), respectively. The color (or other distinguishing appearance) of the icons 208–230 represents the third dimension, which is the location of capture. As one example, there is a group of pictures represented by the icon 230 in the example database which depicts a fifth identifiable event, captured on a fourth identifiable date (this can be general, such as a year), and captured at a seventh identifiable location indicated by an orange color.

From the scatter plot 200 in FIG. 2, it can also be seen that at both the second and third identifiable locations, there are pictures which depict a third identifiable event captured on a second identifiable date.

Figure 3:
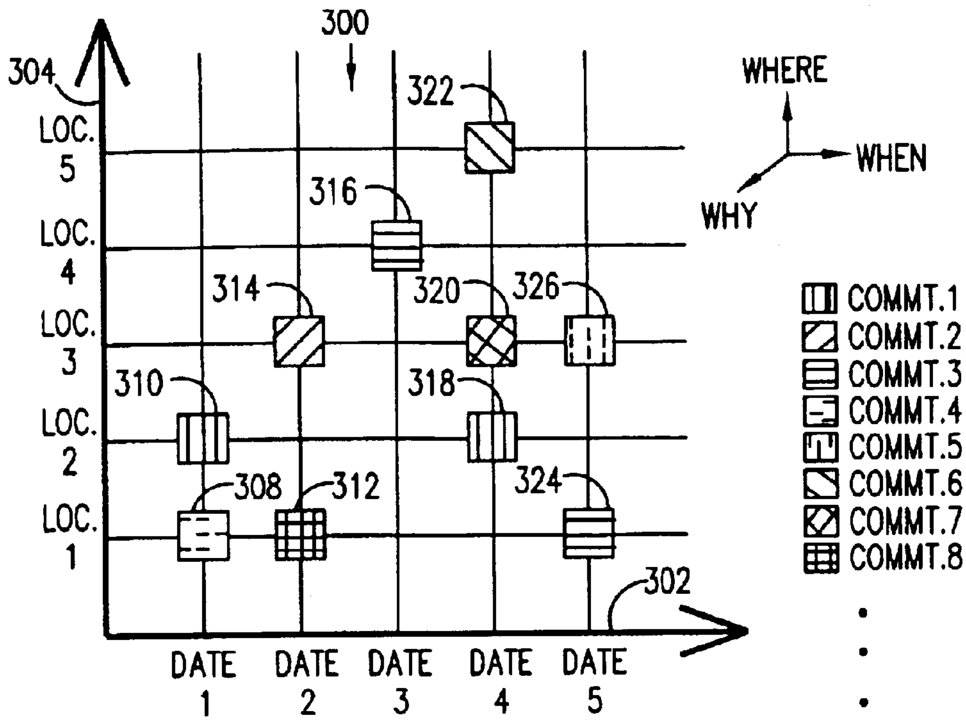
FIG. 3 is an example of a display generated by the GUI of the present invention, wherein the axes of three-dimensional scatter plot contained therein, represent "when," "where," and "why" picture categorization information.

The display 300 in FIG. 3 is an example of a When-Where-Why three-dimensional scatter plot with axes 302 and 304, and picture group icons 308–326. Analogous to the scatter plots of FIGS. 1 and 2, the scatter plot 300 contains groups of pictures whose coordinates are the date of capture, the location of capture, and one of a predefined number of comments or explanations (in the metadata).

Figure 4:
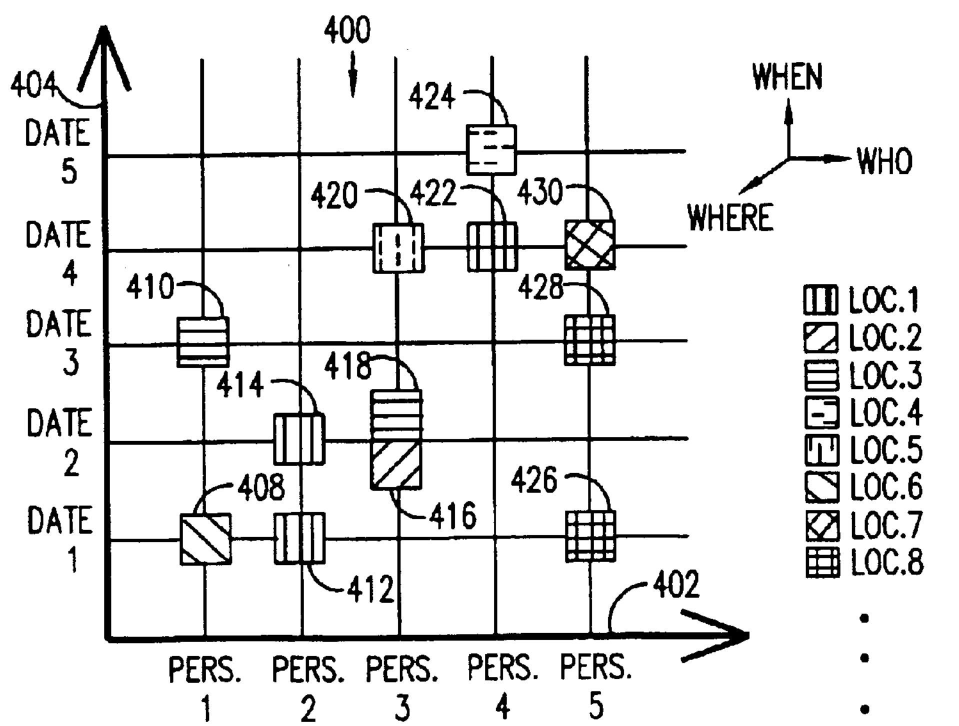
FIG. 4 is an example of a display generated by the GUI of the present invention, wherein the axes of three-dimensional scatter plot contained therein, represent "who," "when," and "where" picture categorization information.

The display 400 in FIG. 4 is an example of a Who-When-Where three-dimensional scatter plot with axes 402 and 404, and picture group icons 408–430. Analogous to the scatter plots of the preceding drawings figures, the scatter plot 400 contains groups of pictures whose coordinates are an identifiable person or persons depicted in the pictures, the date of capture, and the location of capture. As with all scatter plots of the present invention, the coordinates are determined by the picture metadata.

In an alternate embodiment, the icons could be in the nature of spoked wheels, with the number of spokes indicating a different value of the third characteristic.

It will be appreciated by those skilled in the art, that many more combinations of "Who," "What," "When," "Where," and "Why" information can be used to generate scatter plots with the present-inventive GUI. It will also be appreciated by those skilled in the art, that other information categories based on metadata can be used to represent the three dimensions of a scatter plot, given the description of the present invention.

Figure 5:
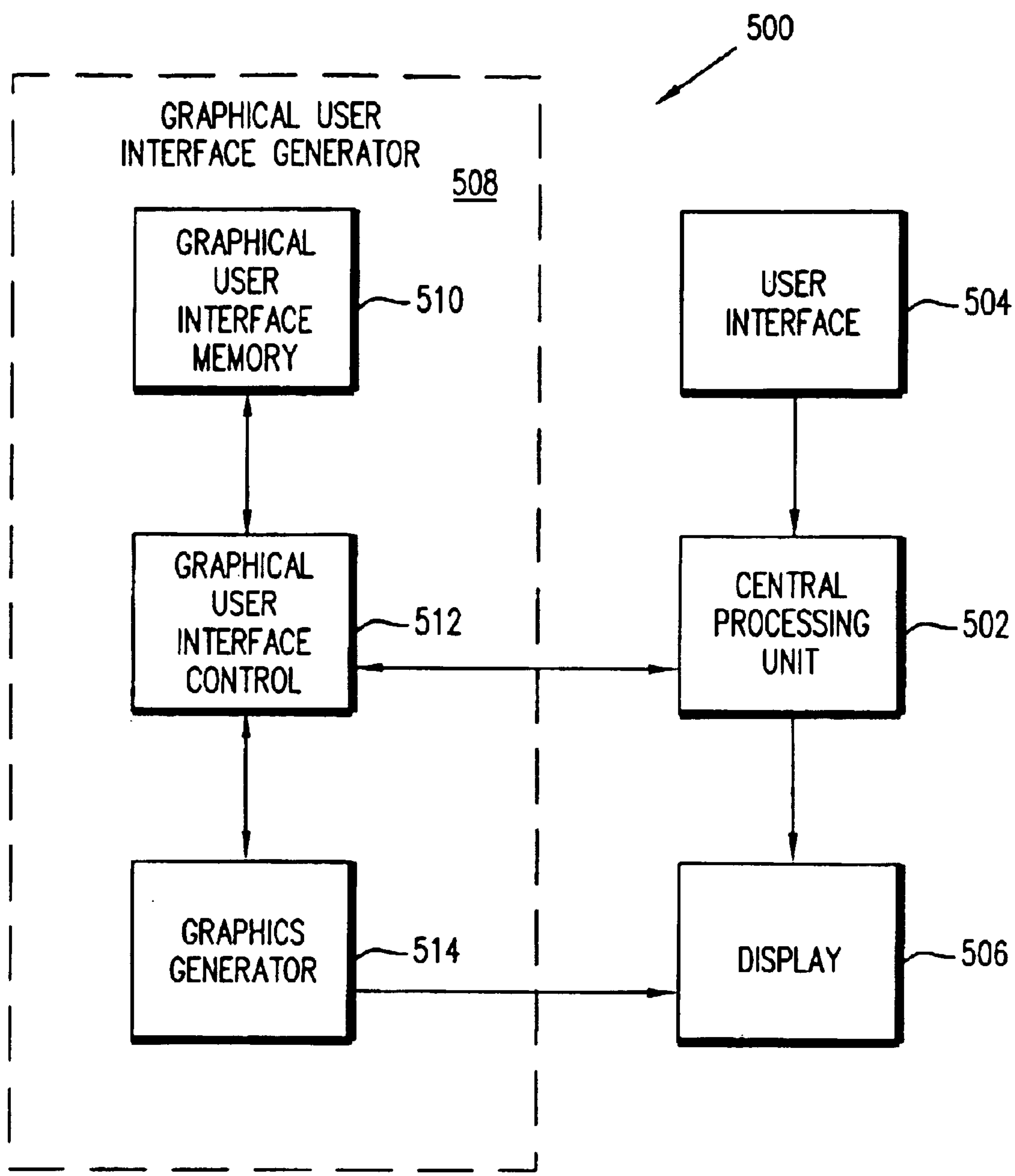
FIG. 5 is a general schematic block diagram of a system capable of implementing the present-inventive GUI.

Given the disclosure of this Letters Patent, those skilled in the art will be able to implement a GUI which generates a three-dimensional scatter plot for more efficient and user-friendly browsing and retrieval of pictures stored in an image database. However, a general GUI system 500 for implementing the present invention is conceptually illustrated in FIG. 5.

The various components of the system 500 need not have physical proximity. Indeed, the system 500 can be self-contained in a stand-alone computer system, part of a Local Area Network (LAN), or part of a remote processing system using Wide Area Networks (WANs) such as the Internet, to name a few variations.

The system 500 includes a CPU 502 as do computer systems in general, a user interface 504 which allows a user to input commands and information (e.g., via a keyboard and mouse), and a display 506 for viewing the scatter plots, thumbnails, pictures, and other graphics, and a GUI generator 508 for generating dynamic scatter plots.

The GUI generator 508 generates the scatter plots representing pictures in the picture database loaded into a GUI memory 510. A GUI control 512 strips the metadata from the image files to determine the scatter plot to be generated, along with the value of the three dimensions. In response to the GUI control 512, a graphics generator 514 generates for display, the axes, icons and other graphics to produce the present-inventive, picture database three-dimensional scatter plots.

The present invention allows the user to specify exactly which picture characteristics to use for the scatter plots, and which dimension to correspond to a given picture characteristic. A change or update in one dimension automatically updates the other two picture dimensions.

Variations and modifications of the present invention are possible, given the above description. However, all variations and modifications which are obvious to those skilled in the art to which the present invention pertains are considered to be within the scope of the protection granted by this Letters Patent.

PARTS LIST

100 Three-dimensional scatter plot (who-what-when)
102 Horizontal axis (who)
104 Vertical axis (what)
108–126 Picture group icons (when)
200 Three-dimensional scatter plot (what-when-where)
202 Horizontal axis (what)
204 Vertical axis (when)
208–230 Picture group icons (where)
300 Three-dimensional scatter plot (when-where-why)
302 Horizontal axis (when)
304 Vertical axis (where)
308-326 Picture group icons (why)
400 Three-dimensional scatter plot (who-when-where)
402 Horizontal axis (who)
404 Vertical axis (when)
408–430 Picture group icons (where)
500 Graphical User Interface (GUI) system
502 Central Processing Unit (CPU)
504 User interface
506 Display
508 GUI generator
510 GUI memory
512 GUI control
514 Graphics generator

What is claimed is:

1. A method of navigating and retrieving pictures in a picture database comprising the steps of:

providing a first display dimension representing a first characteristic of the pictures;

providing a second display dimension representing a second characteristic of the pictures;

providing a third display dimension representing a third characteristic of the pictures;

determining groups of pictures according to the first, second and third characteristics, and providing in the manner of a scatter plot, a plurality of picture icons plotted according to a first dimension along a first axis corresponding to said first display dimension, and a second dimension along a second axis corresponding to said second display dimension, with each picture icon indicating a determined group of pictures;

wherein said third dimension is evidenced by distinct visual characteristics of said icons.

2. The method in claim 1, wherein said first, second and third dimensions for a group of pictures indicated by an icon are determined by metadata stored with picture data in the picture database.

3. The method in claim 1, wherein said first, second and third dimensions correspond to picture characteristics stored in the form of metadata, and said first, second and third axes are configurable by a user to represent specific picture characteristics from a plurality of picture characteristic choices.

4. The method in claim 1, wherein said first, second and third dimensions and axes are dynamically linked, so that a change in one dimension automatically updates one or more other dimensions.

5. The method in claim 1, wherein said groups of pictures are pictures in a common filmstrip.

6. The method in claim 1, wherein said third dimension is evidenced by color differences in said icon.

7. The method in claim 1, wherein the number of gradations in said third dimension are determinable by a user.

8. The method in claim 1, wherein said picture characteristics comprise one or more identifiable persons in pictures.

9. The method in claim 1, wherein said picture characteristics comprise one or more identifiable objects in pictures.

10. The method in claim 1, wherein said picture characteristics comprise one or more identifiable events associated with pictures.

11. The method in claim 1, wherein said picture characteristics comprise temporal picture capture information.

12. The method in claim 11, wherein said temporal picture capture information comprises the date of capture.

13. The method in claim 11, wherein said temporal picture capture information comprises the time of day of capture.

14. The method in claim 1, wherein said picture characteristics comprise one or more identifiable capture locations associated with pictures.

15. The method in claim 1, wherein said picture characteristics comprise one or more predefined explanatory comments.

16. A graphical user interface adapted to navigate and retrieve pictures in a picture database, said graphical user interface (GUI) comprising:

a first display dimension generator adapted to generate a first display dimension representing a first characteristic of the pictures;

a second display dimension generator adapted to generate a second display dimension representing a second characteristic of the pictures;

a third display dimension generator adapted to generate a third display dimension representing a third characteristic of the pictures; and an icon generator adapted to determine groups of pictures according to the first, second and third dimensions, and to generate in the manner of a scatter plot, a plurality of picture icons plotted according to a first dimension along a first axis corresponding to said first display dimension, and a second dimension along a second axis corresponding said second display dimension, each picture icon indicating a determined group of pictures;

wherein said third dimension is evidenced by distinct visual characteristics of said icons.

17. The GUI in claim 16, wherein said first, second and third dimensions for a group of pictures indicated by an icon are determined by metadata stored with picture data in the picture database.

18. The GUI in claim 16, wherein said first, second and third dimensions correspond to picture characteristics stored in the form of metadata, and said first, second and third axes are configurable by a user to represent specific picture characteristics from a plurality of picture characteristic choices.

19. The GUI in claim 16, wherein said first, second and third dimensions and axes are dynamically linked, so that a changes in one dimension automatically updates one or more other dimensions, axes, or groups.

20. The GUI in claim 16, wherein said groups of pictures are pictures in a common filmstrip.

21. The GUI in claim 16, wherein said third dimension is evidenced by color differences in said icon.

22. The GUI in claim 16, wherein the number of gradations in said third dimension are determinable by a user.

23. The GUI in claim 16, wherein said picture characteristics comprise one or more identifiable persons in pictures.

24. The GUI in claim 16, wherein said picture characteristics comprise one or more identifiable objects in pictures.

25. The GUI in claim 16, wherein said picture characteristics comprise one or more identifiable events associated with pictures.

26. The GUI in claim 16, wherein said picture characteristics comprise temporal picture capture information.

27. The GUI in claim 26, wherein said temporal picture capture information comprises the date of capture.

28. The GUI in claim 26, wherein said temporal picture capture information comprises the time of day of capture.

29. The GUI in claim 16, wherein said picture characteristics comprise one or more identifiable capture locations associated with pictures.

30. The GUI in claim 16, wherein said picture characteristics comprise one or more predefined explanatory comments.

* * * * *